United States Patent [19]

Yamashita et al.

[11] Patent Number: 5,781,119
[45] Date of Patent: Jul. 14, 1998

[54] VEHICLE GUIDING SYSTEM

[75] Inventors: Masanobu Yamashita, Toyota; Akihide Tachibana; Keiji Aoki, both of Susono, all of Japan

[73] Assignee: Toyota Jidosha Kabushiki Kaisha, Toyota, Japan

[21] Appl. No.: 608,167

[22] Filed: Feb. 28, 1996

[30] Foreign Application Priority Data

Mar. 14, 1995 [JP] Japan .................... 7-054271
Jun. 21, 1995 [JP] Japan .................... 7-154857

[51] Int. Cl.$^6$ ........................................ G08G 1/16
[52] U.S. Cl. .................... 340/903; 340/902; 340/905; 340/435; 180/168
[58] Field of Search ........................ 340/902, 903, 340/905, 539, 435, 436; 180/167–168, 171; 364/447, 460, 461, 455, 456

[56] References Cited

U.S. PATENT DOCUMENTS

| | | | |
|---|---|---|---|
| 3,835,950 | 9/1974 | Asano et al. | 180/167 |
| 3,941,201 | 3/1976 | Hermann et al. | 180/168 |
| 4,215,759 | 8/1980 | Diaz | 180/168 |
| 4,361,202 | 11/1982 | Minovitch | 180/168 |
| 4,401,181 | 8/1983 | Schwarz | 180/168 |
| 4,621,705 | 11/1986 | Etoh | 180/169 |
| 4,656,463 | 4/1987 | Anders et al. | 340/572 |
| 4,706,086 | 11/1987 | Panizza | 340/902 |
| 4,908,557 | 3/1990 | Sudare et al. | 318/587 |
| 4,934,477 | 6/1990 | Dai | 140/271 |
| 4,962,457 | 10/1990 | Chen et al. | 701/200 |
| 5,091,726 | 2/1992 | Shyu | 340/904 |
| 5,127,486 | 7/1992 | Yardley et al. | 180/168 |
| 5,189,612 | 2/1993 | Lemercier et al. | 701/23 |
| 5,229,941 | 7/1993 | Hattori | 701/26 |
| 5,249,027 | 9/1993 | Mathur et al. | 356/1 |
| 5,289,183 | 2/1994 | Hassett et al. | 340/905 |
| 5,295,551 | 3/1994 | Sukonick | 180/167 |
| 5,331,561 | 7/1994 | Barrett et al. | 364/447 |
| 5,347,456 | 9/1994 | Zahng et al. | 701/23 |
| 5,357,432 | 10/1994 | Margolis et al. | 701/23 |
| 5,369,591 | 11/1994 | Broxmeyer | 364/461 |
| 5,381,095 | 1/1995 | Andrews | 324/326 |
| 5,387,916 | 2/1995 | Cohn | 342/44 |
| 5,416,711 | 5/1995 | Gran et al. | 364/436 |
| 5,420,794 | 5/1995 | James | 701/117 |
| 5,424,726 | 6/1995 | Beymer | 340/902 |
| 5,504,482 | 4/1996 | Schreder | 340/995 |

FOREIGN PATENT DOCUMENTS

| | | |
|---|---|---|
| 0357963 | 3/1990 | European Pat. Off. |
| 1-197133 | 8/1989 | Japan. |
| 1-253007 | 10/1989 | Japan. |
| 4-191134 | 7/1992 | Japan. |
| 4-241100 | 8/1992 | Japan. |

*Primary Examiner*—Jeffery A. Hofsass
*Assistant Examiner*—Ashok Mannaua
*Attorney, Agent, or Firm*—Kenyon & Kenyon

[57] ABSTRACT

A vehicle guiding system enables a plurality of vehicles to run in a platoon with minimum assistance from drivers, and is intended to enhance effective use of from auto-drive lane. When the vehicle runs in the platoon, a front running vehicle detects its displacement from a magnetic nail, and calculates a steering amount to be corrected (i.e. control variables). The front running vehicle not only controls its own movements on the basis of the control variable data but also transmits them to a following vehicle. The following vehicle does not detect its displacement from the magnetic nail, but controls its steering amount on the basis of the received control variable data. The first following vehicle transfers the control variable data to a further following vehicle. The further following vehicle simply receives the control variable data from the following vehicle, and does not calculate its own control variables. This reduces a distance between the vehicles which is necessary for each vehicle to perform such calculation.

4 Claims, 8 Drawing Sheets

102: TRAFFIC CONTROL RADIO TAG
100: MAGNETIC NAIL
104: RADIO TAG

VEHICLE GUIDING SYSTEM

FILED OF THE INVENTION

The present invention relates to a vehicle guiding system, and more particularly to a system for controlling vehicles so that they run in a platoon with the minimum of drivers' assistance.

DESCRIPTION OF THE RELATED ART

There has been known a system for guiding a vehicle along magnetic markers which are placed on a road surface and sensed by a magnetic sensor installed in the vehicle.

For instance, Japanese Patent Laid-Open Publication No. Hei 1-253,007 discloses a system and method for controlling and guiding a driverless cart. In the system, magnets are placed at fixed points on a road surface along a driving route, magnetic field intensities of the magnets are detected by a magnetic sensor, and the driverless cart is controlled so as to reduce its deviation from the route and run along a fixed path.

However, the following problem is conceivable when a variety of vehicles tend to have an auto-drive function and run on auto-drive lanes. The vehicle with the auto-drive function is simply called "a vehicle" in this specification. Specifically, each vehicle detects magnetic markers placed on a road surface, and its controller calculates a deviation from a fixed path on the basis of detected magnetic field intensities, and determines a vehicle speed or a steering amount to be corrected. These operations take a certain amount of time, so it is necessary for the vehicle to keep a sufficient safe distance between itself and a vehicle ahead. Therefore, when a large number of vehicles move on an autodrive lane, such a lane cannot be efficiently utilized due to limited distances between the vehicles. As a result, the auto-drive lane cannot be used for guiding the vehicles in a platoon even when there are sufficient distances between the vehicles if they run individually.

SUMMARY OF THE INVENTION

The present invention is intended to overcome the foregoing problem, and provides a vehicle guiding system which permits reduction of a distance between a vehicle and a vehicle ahead, and efficient use of an auto-drive lane even when a large number of vehicles run thereon.

In order to accomplish the foregoing object of the invention, there is provided a vehicle guiding system which enables a plurality of vehicles to run in a platoon. In the vehicle guiding system, a front running vehicle includes: sensor units for detecting a relative deviation of the front running vehicle from a base line of a road; a calculation unit for calculating, on the basis of the detected relative deviation, control variables for enabling the front running vehicle to run along the base line; a transmitter for transmitting the control variable data calculated by the calculation means to a vehicle following the front running vehicle; a receiver for receiving the control variable data from the transmitter; a storage unit for storing the control variable data received via the receiver; and a controller for determining a correction amount on the basis of the received control variable data when the following vehicle reaches a position where the front running vehicle transmitted the control variable data, and controls the following vehicle on the basis of the correction amount.

The following vehicle runs at a constant speed with a distance maintained between itself and the front running vehicle, and controls its own movements on the basis of the received control variable data in a certain period of time after receiving them via the receiver.

The transmitter of the front running vehicle transmits data concerning a position of the front running vehicle as well as the control variable data. The following vehicle controls its operation when it reaches the position indicated in the received positional data. The positional data is preferably an identification code ID of a beacon laid along a road.

The following vehicle includes a correcting unit for correcting the received control variable data depending upon the type of the front running vehicle and the type of the following vehicle.

The following vehicle includes a transmitter for transmitting the corrected control variable data to further following vehicles. Each of the following vehicles is controlled on the basis of the corrected control variable data received from a vehicle ahead.

The vehicle guiding system further comprises a signalling unit which is installed along the road, detects a vehicle running on its own and notifies the presence of the vehicle to a base station. The base station guides a lead vehicle immediately in front of the vehicle running alone, and enables the lead vehicle to function as a front running vehicle in a platoon. The signalling unit detects a vehicle running alone when no vehicle is present within a predetermined distance in front of such a vehicle.

The vehicle guiding system further comprises a command issuing unit which is installed at an interchange, detects a vehicle merging onto a through traffic lane, and issues a command for increasing a distance in front of the front running vehicle in the platoon. The controller of the following vehicle increases the distance between itself and the front running vehicle in accordance with the issued command. The command is issued, for instance, by a first beacon installed at a merging point of the interchange and a second bacon installed above the through traffic lane. When the beacon at the merging point detects the merging vehicle, it transmits a signal indicative of the presence of such a vehicle to the beacon above the through traffic lane, which then issues the command for increasing the distance in front of the front running vehicle.

Further, the vehicle guiding system comprises an evaluating unit which is installed along the road and evaluates levels of traffic congestion, and a command output unit for issuing a command to reduce the distance between the front running vehicle and the following vehicle when the evaluating unit recognizes heavy traffic. The controller of the following vehicle reduces the distance between the front running vehicle and the following vehicle in response to the issued command.

According to the invention, the vehicles running in the platoon, except for the front running vehicle, do not have to detect their displacement from the base line of the auto-drive lane or to calculate control variables. Thus, it is not necessary to maintain distances which are required when calculating the control variables, which assures efficient use of the auto-drive lane. Further, when a plurality of vehicle run alone on the auto-drive lane, a dedicated lead vehicle is guided in front of such vehicles, and guides these vehicles in the platoon. The distances between the vehicles in the platoon can be flexibly controlled depending upon the presence of a merging vehicle or a traffic jam.

BRIEF DESCRIPTION OF THE DRAWINGS

The present invention will become more apparent from the following detailed description of presently preferred

3 embodiments when taken in conjunction with the accompanying drawings.

DESCRIPTION OF THE PREFERRED EMBODIMENTS

Embodiment 1

Figure 1:
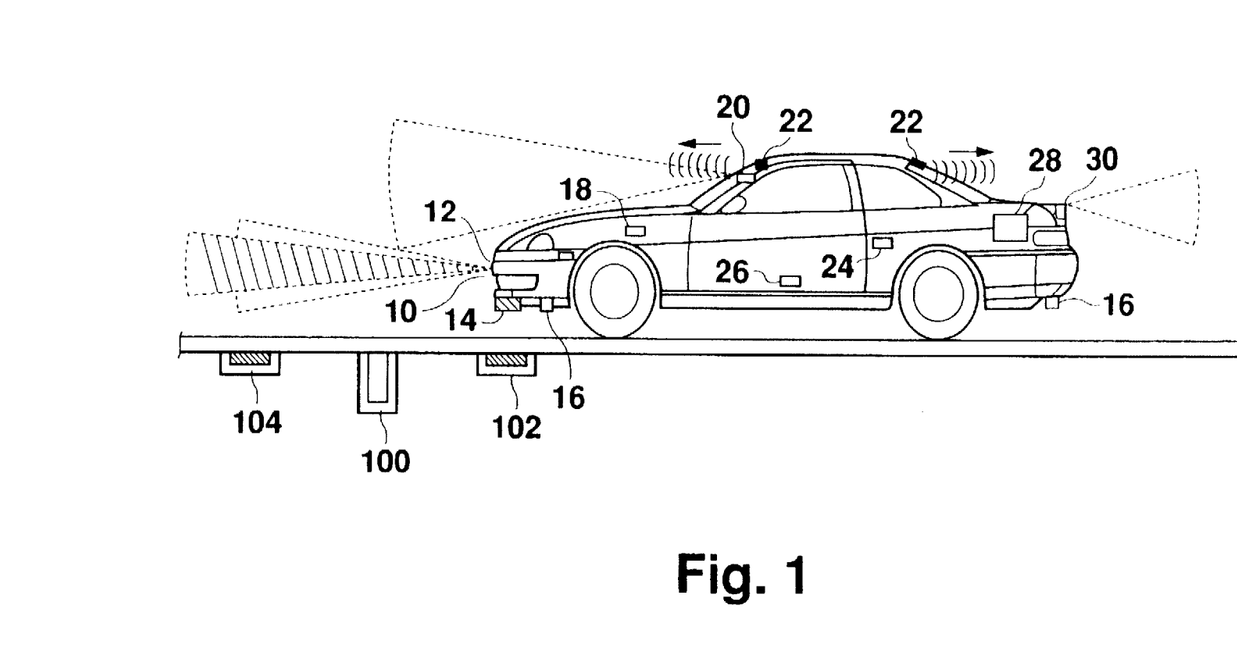
FIG. 1 is a schematic view showing the configuration of a vehicle to be guided by a vehicle guiding system according to the present invention.

FIG. 1 shows the configuration of a vehicle which has an auto-drive function and is guided by a vehicle guiding system of the invention. The vehicle includes: a short-distance laser radar 10 for measuring a distance between the vehicle and a vehicle ahead; a long distance millimeter wave radar 10 for detecting obstacles or the like present in front of the vehicle; front and rear magnetic sensors 16 which are positioned at front and rear ends of the vehicle and sense magnetic nails or magnetic markers; an actuator 18 for controlling a throttle valve, a steering wheel, a brake pedal and so on; a front monitor CCD camera 20 for not only detecting front obstacles but also establishing vehicle-to-vehicle communication with the front running vehicle; an infrared ray LED 22 for establishing vehicle-to-vehicle communication between the front running and following vehicles; a side monitor CCD camera 24; a yaw rate sensor 26; a controller 28 for activating the actuator 18 in response to signals obtained by the sensors and controlling a steering amount, a vehicle speed and vehicle-to-vehicle communications; and a rear monitor CCD camera 30 for not only detecting obstacles present at the rear of the vehicle but also establishing vehicle-to-vehicle communications with a vehicle behind.

When the vehicle is running alone, i.e. not in a platoon, on an auto-drive lane, the magnetic sensors 16 detect magnetism of the magnetic nails 100. The controller 28 calculates a relative position of the vehicle with respect to a road surface, i.e. a displacement of the vehicle from the center of the lane, on the basis of detected magnetic field intensity. The front and rear magnetic sensors 16 include four sensing elements, i.e. a pair of front magnetic sensing elements and a pair of rear magnetic sensing elements, which are positioned at the opposite front and rear sides of the vehicle with respect to its longitudinal center line. The relative displacement of the vehicle is determined on the basis of differences of magnetic field intensities detected by each pair of front and rear magnetic sensors 16. On the basis of the relative displacement, the controller 28 determines an optimum steering amount so as to guide the vehicle to the center of the lane, and outputs a control signal to the actuator 18.

Alternatively, radio tags 102 and 104 may be placed on the road surface in addition to the magnetic nails 100 so that these tags 102, 104 transmit road surface data. The controller 28 may guide the vehicle in accordance with the relative displacement and the road surface data received via a radio receiver 14. In such a case, it is possible to reliably guide the vehicle in a section between a first magnetic nail and a second magnetic nail, i.e. where no magnetic nails are present.

On the other hand, when a large number of vehicles run on an auto-drive lane in a platoon, it is necessary to maintain sufficient distances between the vehicles taking time required for the foregoing processing into consideration. Therefore, there is a problem that the number of vehicles which can run on each auto-drive lane has to be limited so as to keep the sufficient distances between them.

In order to overcome this problem, only the front running vehicle detects its relative displacement from the magnetic nails 100 and corrects its path of travel. Then, the following vehicles receive the correcting information using the vehicle-to-vehicle communications, and correct their path. Thus, the following vehicles do not have to detect their relative displacement from the magnetic nails 100 and to calculate a steering amount to be corrected. This indicates that the distances between the vehicles can be determined without taking into account the time necessary for the foregoing processing. Thus, the vehicle guiding system guides the vehicles in the platoon using the vehicle-to-vehicle communications.

Figure 2:
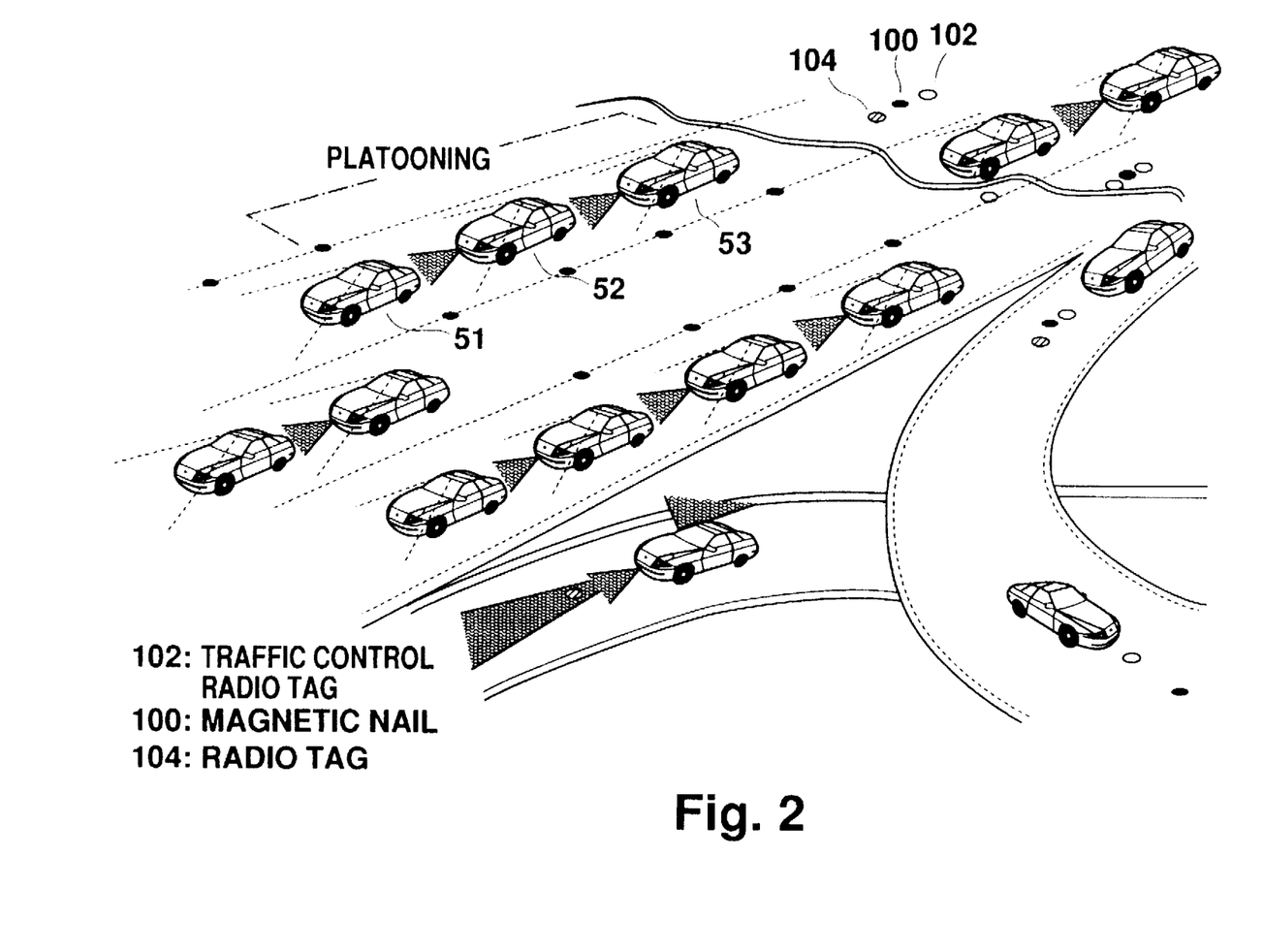
FIG. 2 shows a state in which vehicles run in a platoon.

Referring to FIG. 2, the vehicles run in the platoon.

The vehicle 51 at the head of the platoon (called "the front running vehicle 51") detects a magnetic field of the magnetic nail 100, and determines its relative displacement from the center line. The controller 28 determines a control variable (e.g. a steering amount to be corrected) on the basis of the relative displacement, or both the relative displacement and the road surface data provided by the radio tags 102 and 104.

The controller 28 simultaneously transmits the control variable to a following vehicle 52 using the infrared LED 22. On the basis of the received control variable, a controller 28 of the vehicle 52 determines a steering amount to be corrected so as to guide the vehicle 52 to the center of the auto-drive lane. The steering amount to be corrected is determined as follows. The received control variable is applicable only at the current position of the front running vehicle 51. Therefore, the controller 28 of the vehicle 52 calculates the time taken for the vehicle 52 to reach the position of the vehicle 51 (where the control variables was calculated) on the basis of the distance from the vehicle 51 and a speed of the vehicle 52, and determines a steering amount to be corrected after a lapse of the calculated time following the reception of the control variable from the front running vehicle 51. In this case, when the vehicle 52 continuously controls its speed so as to maintain the constant distance from the front running vehicle 51, the received control variable data can be used to enable the vehicle 52 to run on the center of the auto-drive lane at a predetermined time (e.g. within three seconds after receiving the control variable). In other words, the vehicle 52 can control its position easily and quickly compared with a case in which the vehicle 52 itself detects its relative displacement from the magnetic nails 100 and calculates a steering amount to be corrected.

Further, the vehicle 51 may also transmit its positional data (i.e. positional data in an advancing direction) as well as its control variable to the following vehicle 52. In the vehicle 52. the controller 28 may use the received control variable data so as to determine a steering amount to be corrected when the vehicle 52 is identified. by a GPS or based on positional data from the road beacon. as reaching the position denoted by the positional data.

After determining its corrected control variable data, the vehicle 52 transmits them to a following vehicle 53 using the infrared ray LED 22. Receiving the control variable from the vehicle 52. the vehicle 53 determines its control variables as described above.

The vehicle 52 or 53 receives the control variable data from the front running vehicle 51 at a time t1 (or at a position p1), and controls itself on the basis of the received control variable data at a later time t2 (at a position p2 where the front running vehicle 51 was present when it transmitted the control variable data). Thus, it is not necessary for either the vehicle 52 or 53 to calculate its own control variables after it arrives at the position p2), which indicates that the vehicles 52 or 53 can be quickly guided.

Figure 3:
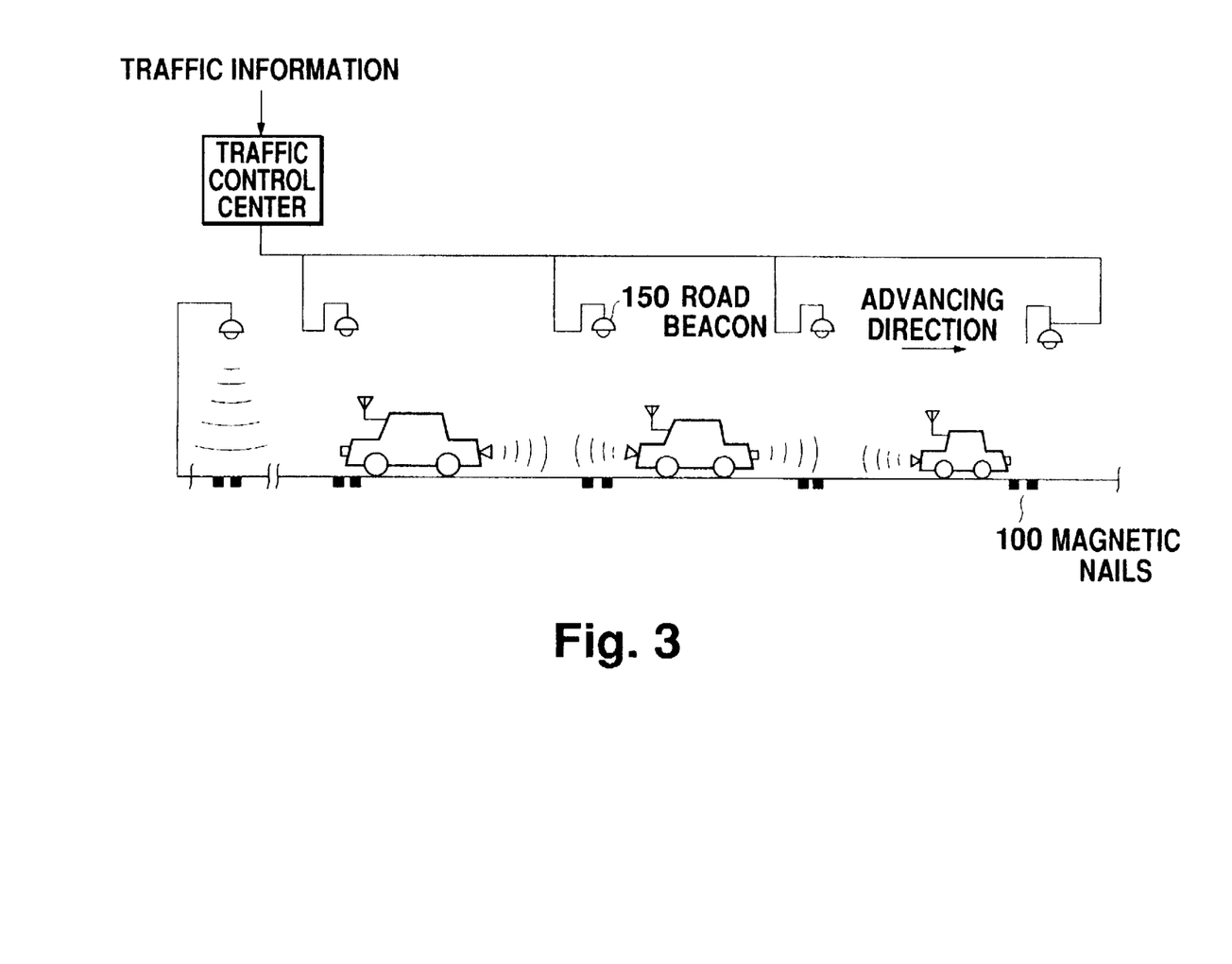
FIG. 3 is a schematic view showing the configuration of the vehicle guiding system.

Referring to FIG. 3, a magnetic nail 100 and a road beacon 150 are installed as a set, and a plurality of these sets are installed along the auto-drive lane.

The road beacons 150 transmit a variety of traffic data. Receiving the data, the vehicles in the platoon can know about traffic jams and so on. Receiving radio waves from the road beacons 150, the vehicles 52, 53 confirm their positions in the advancing direction, and correct their travel path on the basis of the received control variable data when they reach the position where the control variable were transmitted by the front running vehicle 51. In this case, the data from the road beacon 150 are simply used for confirming the positions of the vehicles 52, 53. Thus, the vehicles 52, 53 can quickly correct their direction. This is because no relative displacement from the center of lane is calculated on the basis of the data from the road beacon 150.

In order to confirm the position of each vehicle in its advancing direction on the basis of data from the road beacon 150, the road beacon 150 may have an identification code ID. In such a case, when arriving at the road beacon having the identification code accompanying the control variable data, each vehicle in the platoon can relay the control variable data from the front running vehicle to a vehicle behind. Thus, the vehicles control themselves on the basis of the received control variable data.

Figure 4:
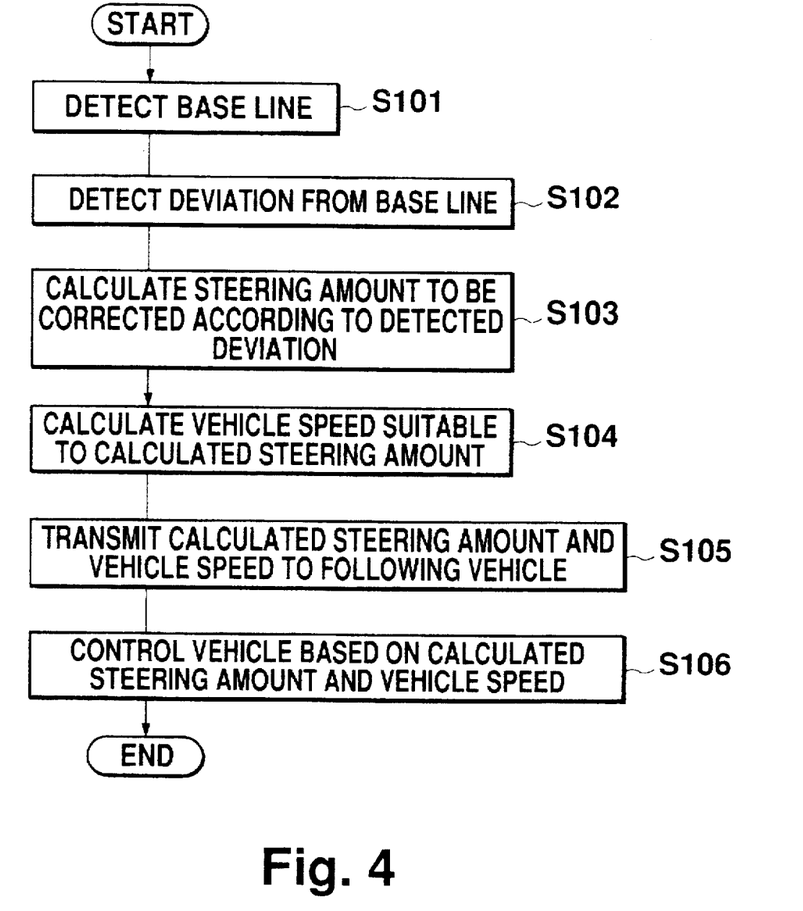
FIG. 4 is a flowchart showing an operation sequence for a front running vehicle.
Figure 5:
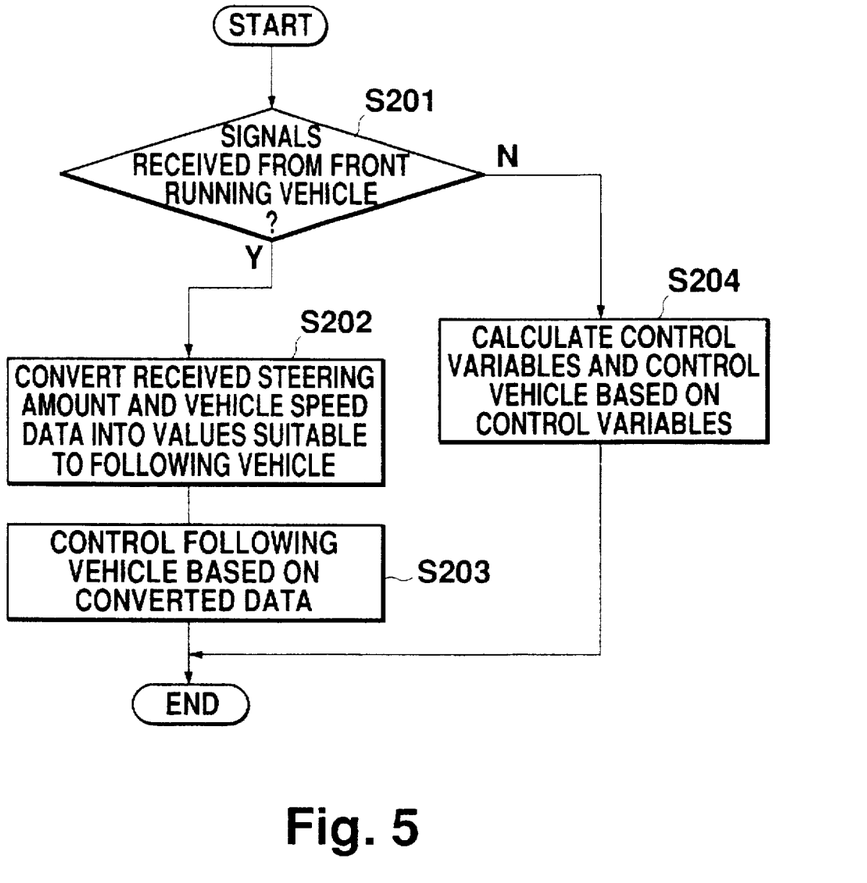
FIG. 5 is a flowchart showing an operation sequence for vehicles following the front running vehicle.

FIG. 4 is a flowchart showing the operation sequence of the front running vehicle 51, and FIG. 5 shows the operation sequence of the following vehicle 52.

First of all, the front running vehicle 51 detects a base line of the road, i.e. a magnetic field of the magnetic nail 100 (step S101), and determines its deviation from the base line (step S102). The controller 28 of the front running vehicle 51 calculates a steering amount to be corrected, on the basis of the deviation (step S103), and also calculates a vehicle speed appropriate for correcting the steering amount to be corrected (step S104). Generally, the greater the steering amount to be corrected, the lower the vehicle speed. Then, the controller 28 transmits the steering amount to be corrected and the calculated vehicle speed, as control variables, to the following vehicle 52 (step S105). Finally, the controller 28 automatically controls the front running vehicle 51 on the basis of the control variable data (step S106).

The following vehicle 52 checks whether or not it has received the control variable data from the front running vehicle 51 (step S201). When they have been received, the controller 28 of the vehicle 52 converts the received steering amount and the vehicle speed data into values optimum for the vehicle 52 (step S202). This conversion is necessary depending upon kinds of vehicle, e.g. when the front running vehicle 51 is a large one and the following vehicle 52 is a small one. The vehicle 52 controls itself on the basis of the converted control variables, and keeps on running in the center of the lane with the predetermined distance (e.g. 50 meters) maintained between itself and the front running vehicle 51 (step S203). The distance is controlled by adjusting the speed of the vehicle 52. Conversely, when no control variable data are received from the front running vehicle 51, the controller 28 of the vehicle 52 determines a displacement from the base line on the basis of a magnetic field intensity of the magnetic nail 100 as shown in FIG. 4, calculates a steering amount to be corrected, and controls the vehicle 52 (step S204).

Embodiment 2

In the foregoing embodiment, each vehicle in the platoon has the magnetic sensors for detecting the magnetic fields of the magnetic nails 100. When the vehicle runs alone, its controller 28 determines the displacement of the vehicle on the basis of detected magnetic field of the magnetic nail 100, and guides the vehicle to the center of the lane. On the other hand, when a plurality of vehicles run in a platoon, the vehicles other than the front running one do not detect the magnetic field of the magnetic nail 100.

In a second embodiment, a vehicle guide system is designed such that a dedicated vehicle (called "lead vehicle") actively guides vehicles which are respectively running alone, thereby leading them in a platoon under the guidance of the lead vehicle.

Figure 6:
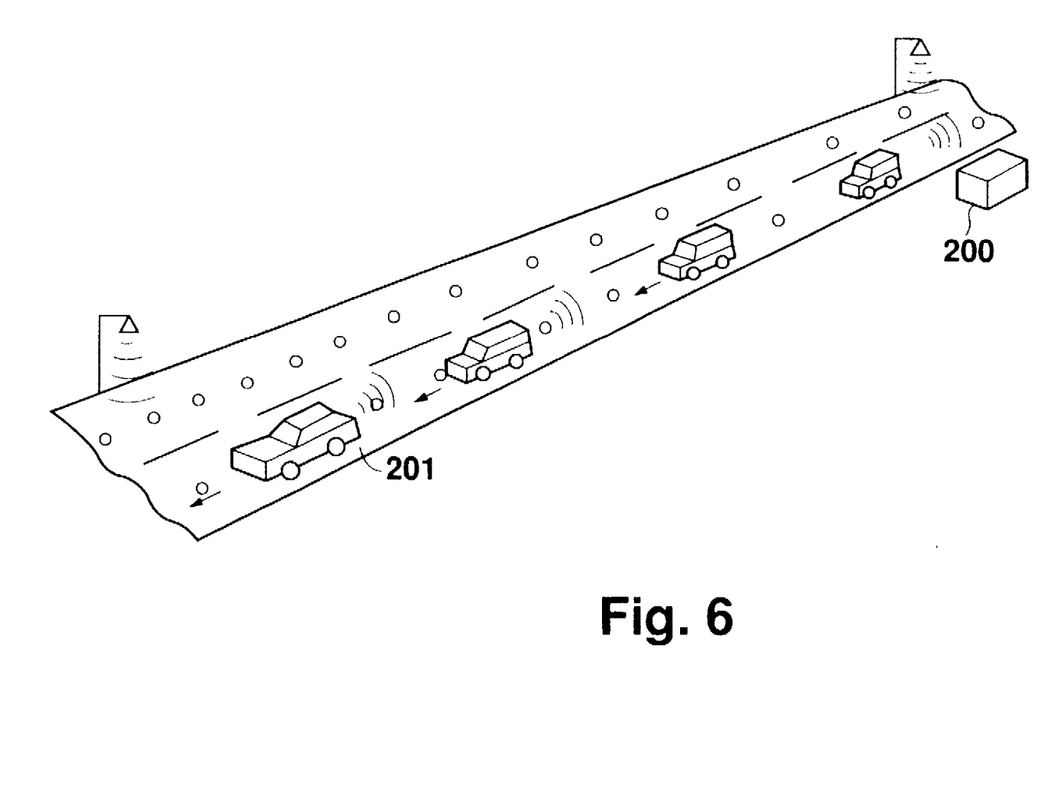
FIG. 6 is a schematic view showing the concept of a vehicle guiding system according to a second embodiment of the invention.

This vehicle guiding system is configured as shown in FIG. 6. In this system, the vehicles other than for the lead vehicle do not include magnetic sensors 16 for detecting the magnetic fields of the magnetic nails 100, but they have only transceivers for receiving and transmitting data concerning control variables. The lead vehicle 201 takes off from a special terminal 200 positioned along a road side. The lead vehicle 201 is guided by a base station which controls traffic conditions. When detecting vehicles running alone via a road side camera or a road beacon as a signalling unit, the base station guides the lead vehicle immediately in front of those vehicles. The vehicle running alone can be identified by checking whether or not there is another vehicle within a predetermined distance (e.g. 400 meters) ahead of such a vehicle.

The lead vehicle 201 has magnetic sensors 16, detects its displacement from the magnetic nails 100, calculates control variables, and transmits them to the following vehicle. Receiving the data on the control variables from the lead vehicle 201, the vehicle which has been running alone until now can be guided in a platoon as described with respect to the first embodiment.

Embodiment 3

Figure 7:
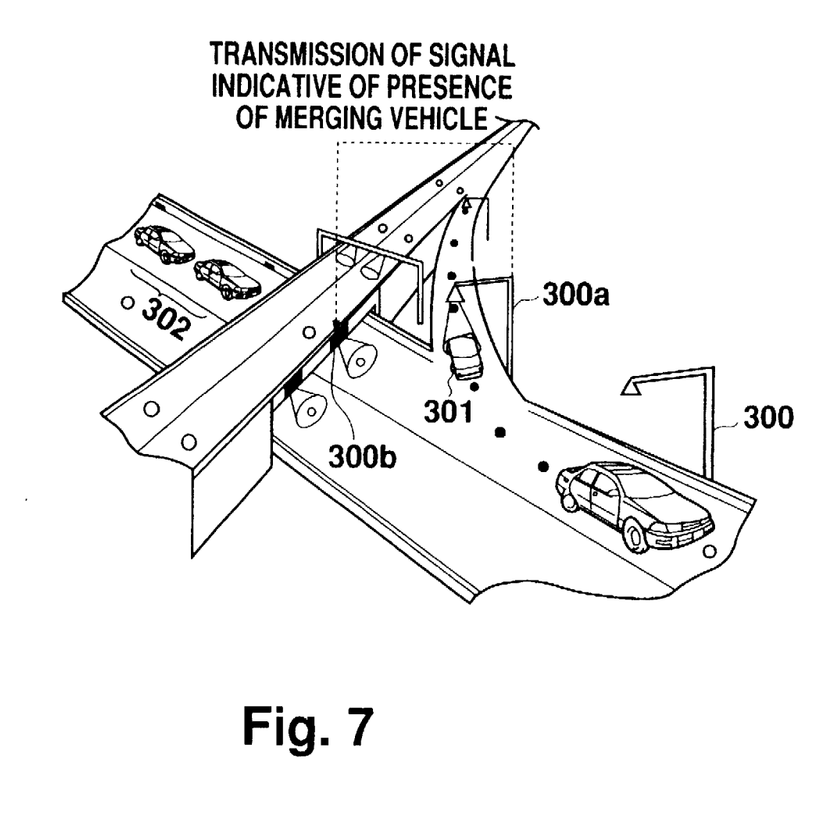
FIG. 7 is a schematic view showing the concept of a vehicle guiding system according to a third embodiment.

In this embodiment, a vehicle guiding system is configured as shown in FIG. 7. On a road surface, there are not only magnetic nails 100 (shown in FIG. 1) but also beacons 300 for transmitting curving data and various items of traffic information. Further, the beacons 300 detect a vehicle 301 which is going to merge into the through traffic lane at an interchange, and transmit data on this vehicle to vehicles running the through traffic lane. In an example shown in FIG. 7, a beacon 300a detects the vehicle 301 which is going to join a through traffic lane (called "merging vehicle" 301), and transmits a signal indicative of the presence of the merging vehicle 301 to a beacon 300b. In response to this signal, the beacon 300b notifies this to a front running vehicle 302 in a platoon. The front running vehicle 302 confirms the presence of the merging vehicle 301, and increases a distance between itself and the merging vehicle 301 so as to allow the merging vehicle 301 to enter the through traffic lane. Specifically, a controller 28 (FIG. 1) of a vehicle 302 in the platoon receives the signal from the beacon 300b, controls a speed of the vehicle 302, and increases a distance in front of the vehicle 302 so that the merging vehicle 301 enters therein. This distance is longer by the distance per vehicle in the platoon than that necessary for platoon running. In the vehicle 302, the controller 28 again controls the speed of the vehicle 302 after it passes through the merging point, thereby resuming the normal distance necessary for the platoon running. The foregoing operation is also applicable when the number of lanes is reduced.

When the auto-drive lane becomes congested during the platoon running, the distances between the vehicles in the platoon will be reduced in this embodiment. Specifically, when a level of traffic congestion is evaluated on the basis of data obtained by the beacons (or road side cameras), e.g. when an average distance on the auto-drive lane is judged to be 50 meters or shorter, the beacon 300b provides a traffic jam signal to the vehicles 302 in the platoon. In response to the traffic jam signal, one of the vehicles 302 controls its speed using its controller 28 in order for the vehicles 302 to run in the platoon with reduced distances (e.g. 50 meter or shorter) maintained therebetween. This enables the platoon running of the vehicles to be effectively performed in accordance with traffic conditions, and the auto-drive lane to be utilized efficiently.

Figure 8:
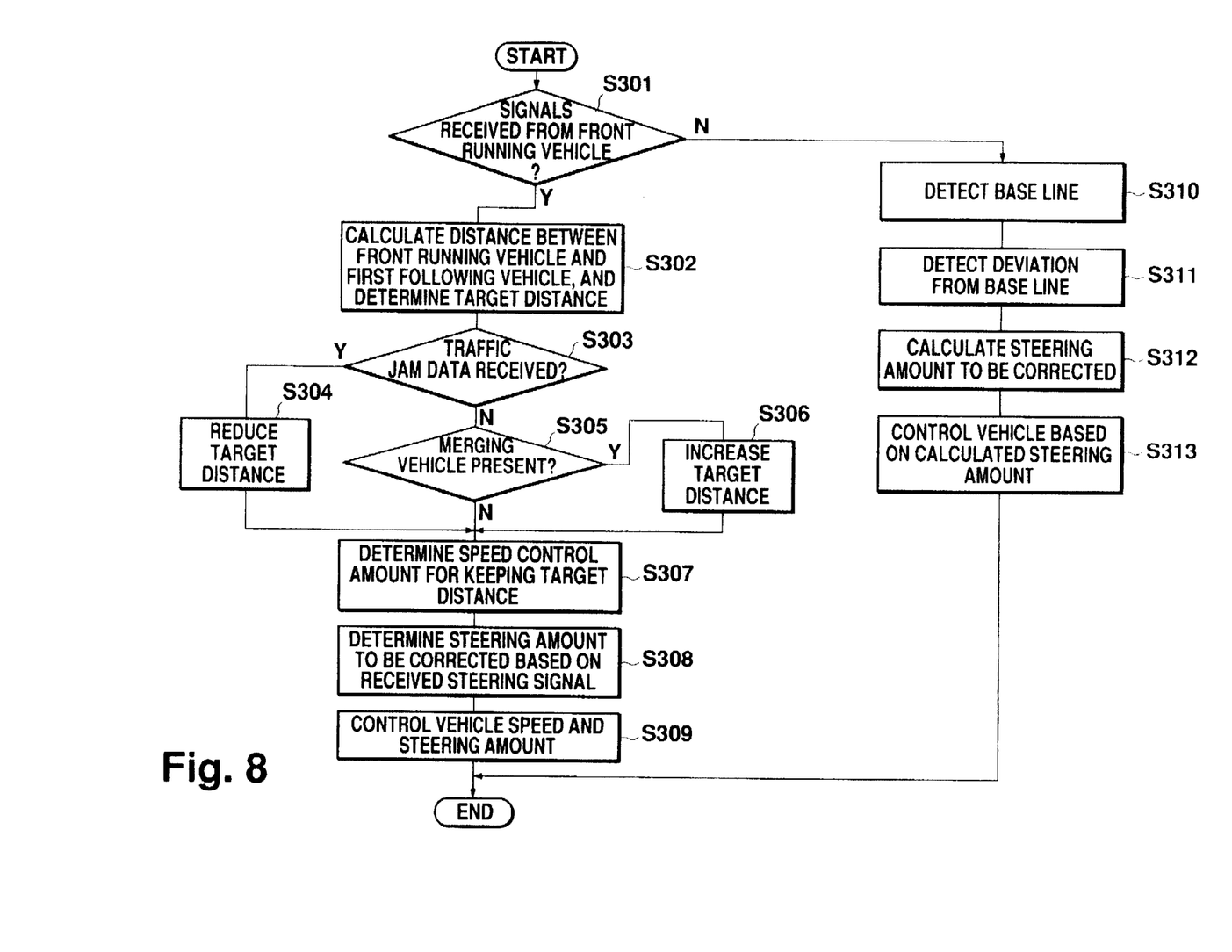
FIG. 8 is a flowchart showing an operation sequence of the vehicle guiding system shown in FIG. 7.

The vehicle guiding system of this embodiment is operated in accordance with the sequence shown in the flowchart of FIG. 8. First of all, the controller 28 of a vehicle following the front running vehicle 302 checks whether or not control variable data have been received (step S301). When an answer is affirmative, the controller 28 calculates, based on the received control variable data, a distance between this vehicle and the front running vehicle 302, and determines a target distance (e.g. 50 meters) (step S302). Then, the controller 28 checks whether or not information indicative of an increase of traffic has been received (step S303). When the answer is affirmative, the target distance is reduced (to 30 meters, for example) (step S304). Otherwise, it is checked whether or not a signal indicative of the presence of a merging vehicle is received from the road beacon, similarly to the foregoing traffic jam signal (step S305). In the presence of the merging vehicle, the target distance will be increased (e.g. to 80 meters) (step S306). Thereafter, the controller 28 of the following vehicle determines a speed (step S307), and controls a steering amount and speed on the basis of a signal which indicates a steering amount to be corrected and is received from the front running vehicle 302 (steps S308 and S309).

On the other hand, when no steering amount correcting data is received from the front running vehicle 302, the controller 28 of the following vehicle detects a base line of the lane (step S310), and detects a deviation (displacement) from the base line (step S311). Then, the controller 28 calculates a target steering amount for offsetting the deviation (step S312), and controls the steering wheel (step S313).

The distance between the vehicles in the platoon is control in accordance with traffic conditions, so the vehicles can efficiently run in the auto-drive lane. Further, the procedure for controlling the distance in this embodiment is also applicable to the second embodiment in which the lead vehicle enables its following vehicles to run in the platoon.

What is claimed is:

1. A vehicle guiding system for enabling a plurality of vehicles to run in a platoon, the system comprising:

(a) sensor means installed on a front running vehicle in the platoon, the sensor means detecting a relative displacement of the front running vehicle from a base line of a road;

(b) calculation means installed on the front running vehicle the calculation means calculating, on the basis of the detected relative displacement, control variables for enabling the front running vehicle to run along the base line;

(c) transmitting means installed on the front running vehicle, the transmitting means transmitting the control variable data from the calculation means to a vehicle following the front running vehicle;

(d) receiving means installed on the following vehicle, the receiving means receiving the control variable data from the transmitting means;

(e) storage means installed on the following vehicle, the storage means storing the control variable data received via the receiving means;

(f) control means installed on the following vehicle, the control means determining a correction amount on the basis of the received control variable data when the following vehicle reaches a position where the front running vehicle transmitted the control variable data, and controlling the following vehicle on the basis of the correction amount; and (g) signaling means which is installed along the road, detects a vehicle running alone and notifies the presence of the vehicle to a base station, wherein the base station guides a lead vehicle in front of the vehicle running alone, and enables the lead vehicle to function as the front running vehicle.

2. The vehicle guiding system as in claim 1, wherein the signalling means detects the vehicle running alone when no vehicle is present within a predetermined distance in front of such a vehicle.

3. A vehicle guiding system for enabling a plurality of vehicles to run in a platoon, the system comprising:

(a) sensor means installed on a front running vehicle in the platoon, the sensor means detecting a relative displacement of the front running vehicle from a base line of a road;

(b) calculation means installed on the front running vehicle, the calculation means calculating, on the basis of the detected relative displacement, control variables for enabling the front running vehicle to run along the base line;

(c) transmitting means installed on the front running vehicle the transmitting means transmitting the control variable data from the calculation means to a vehicle following the front running vehicle;

(d) receiving means installed on the following vehicle, the receiving means receiving the control variable data from the transmitting means;

(e) storage means installed on the following vehicle, the storage means storing the control variable data received via the receiving means;

(f) control means installed on the following vehicle, the control means determining a correction amount on the basis of the received control variable data when the following vehicle reaches a position where the front running vehicle transmitted the control variable data, and controlling the following vehicle on the basis of the correction amount;

(g) evaluating means which is installed along the road and evaluates levels of traffic congestion, and (h) command output means for issuing a command for reducing a distance between the front running vehicle and the following vehicle when the evaluating means recognizes heavy traffic, wherein the control means of the following vehicle reduces the distance in response to the command.

4. The vehicle guide system as in claim 3, wherein said level of traffic congestion indicates an average distance of less than 50 meters between the front running vehicle and the following vehicle.

* * * * *

UNITED STATES PATENT AND TRADEMARK OFFICE
CERTIFICATE OF CORRECTION

PATENT NO. : 5,781,119
DATED : 14 July 1998
INVENTOR(S) : Masanobu YAMASHITA et al.

It is certified that error appears in the above-identified patent and that said Letters Patent is hereby corrected as shown below:

| Column | Line | |
|---|---|---|
| 5 | 30 | Before "were" change "variable" to --variables--. |
| 6 | 64 | After "running" insert --on--. |
| 7 | 65 | Change "control" to --controlled--. |
| 8 | 12 | After "vehicle" insert --,--. |
| 8 | 56 | After "vehicle" insert --,--. |

Signed and Sealed this

Twenty-seventh Day of April, 1999

Attest:

Attesting Officer

Q. TODD DICKINSON

Acting Commissioner of Patents and Trademarks